(12) United States Patent
Takao

(10) Patent No.: US 11,388,378 B2
(45) Date of Patent: Jul. 12, 2022

(54) IMAGE PROCESSING APPARATUS, IMAGE PROCESSING METHOD AND PROJECTION SYSTEM

(71) Applicant: SONY CORPORATION, Tokyo (JP)

(72) Inventor: Yoshiyuki Takao, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/961,140

(22) PCT Filed: Jan. 11, 2019

(86) PCT No.: PCT/JP2019/000628
§ 371 (c)(1),
(2) Date: Jul. 9, 2020

(87) PCT Pub. No.: WO2019/146426
PCT Pub. Date: Aug. 1, 2019

(65) Prior Publication Data
US 2020/0366876 A1    Nov. 19, 2020

(30) Foreign Application Priority Data

Jan. 25, 2018 (JP) .............................. JP2018-010191
Aug. 6, 2018 (JP) .............................. JP2018-147567

(51) Int. Cl.
| | | |
|---|---|---|
| H04N 9/31 | (2006.01) | |
| G06T 3/00 | (2006.01) | |
| H04N 13/282 | (2018.01) | |
| G06T 15/06 | (2011.01) | |

(52) U.S. Cl.
CPC ........... *H04N 9/3185* (2013.01); *G06T 3/005* (2013.01); *G06T 15/06* (2013.01); *H04N 9/3147* (2013.01); *H04N 13/282* (2018.05)

(58) Field of Classification Search
CPC .... H04N 9/3185; H04N 9/3147; G06T 15/06; G06T 3/005; G03B 21/56
See application file for complete search history.

(56) References Cited

U.S. PATENT DOCUMENTS

2013/0257857 A1   10/2013   Kakizawa et al.
2015/0022726 A1    1/2015   Kojima

FOREIGN PATENT DOCUMENTS

| JP | 2005-354644 A | 12/2005 |
|---|---|---|
| JP | 2012-044407 A | 3/2012 |
| JP | 2013-211672 A | 10/2013 |
| JP | 2015-038595 A | 2/2015 |

OTHER PUBLICATIONS

International Search Report and Written Opinion of PCT Application No. PCT/JP2015/000628, dated Mar. 26, 2019, 08 pages.

*Primary Examiner* — Ryan D Howard
(74) *Attorney, Agent, or Firm* — Chip Law Group

(57) ABSTRACT

An image processing apparatus, an image processing method, and a projection system are provided. The image processing apparatus according to one embodiment includes a calculating section which, on the basis of a positional relationship between a viewpoint position set in front of a curved display surface and a virtual surface set behind the display surface, calculates the positions of respective pixels on the display surface, the pixels being included in a planar image generated on the assumption that the planar image is displayed on a plane, and displays the planar image on the display surface such that the respective pixels are displayed at the calculated positions.

14 Claims, 18 Drawing Sheets

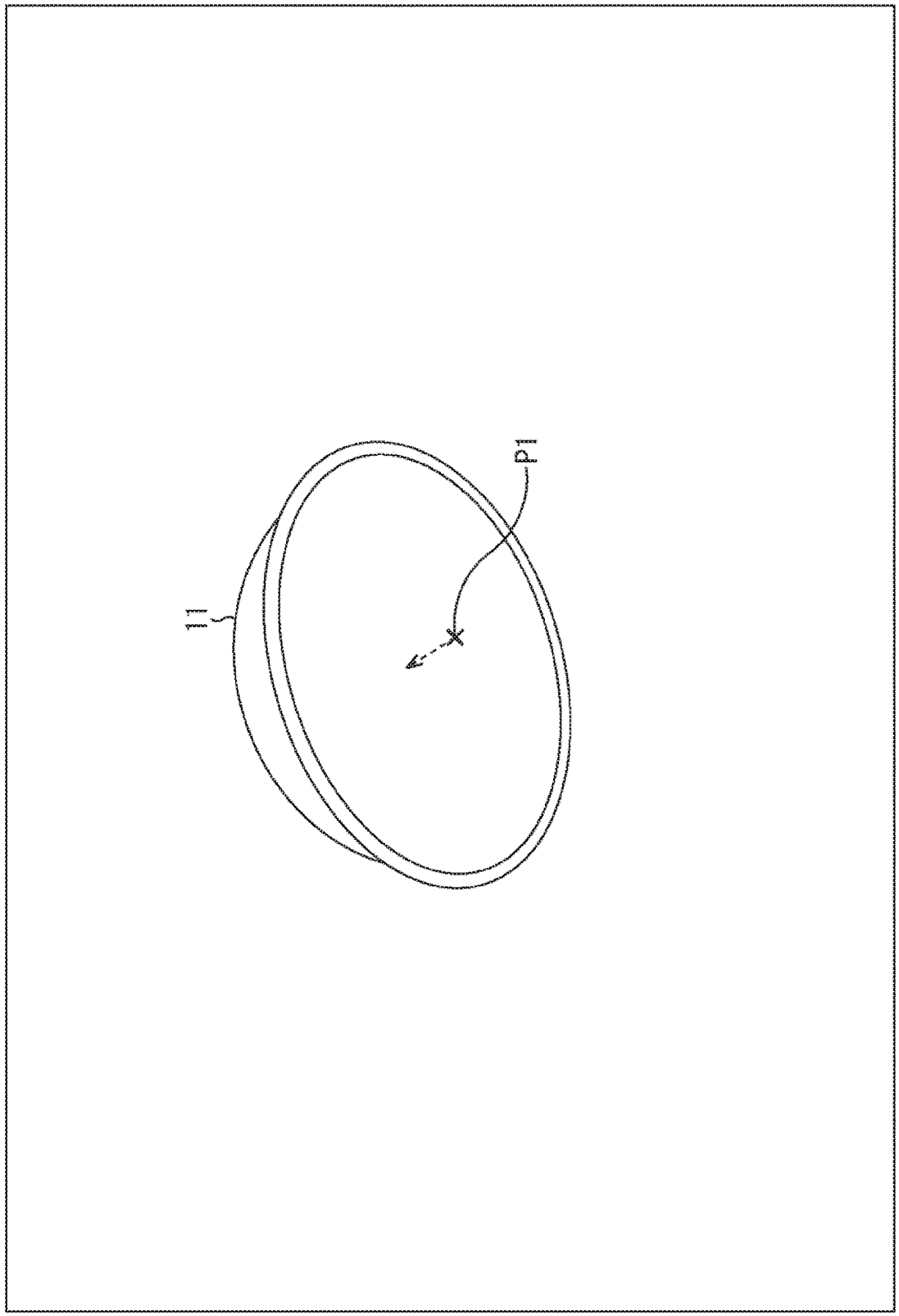

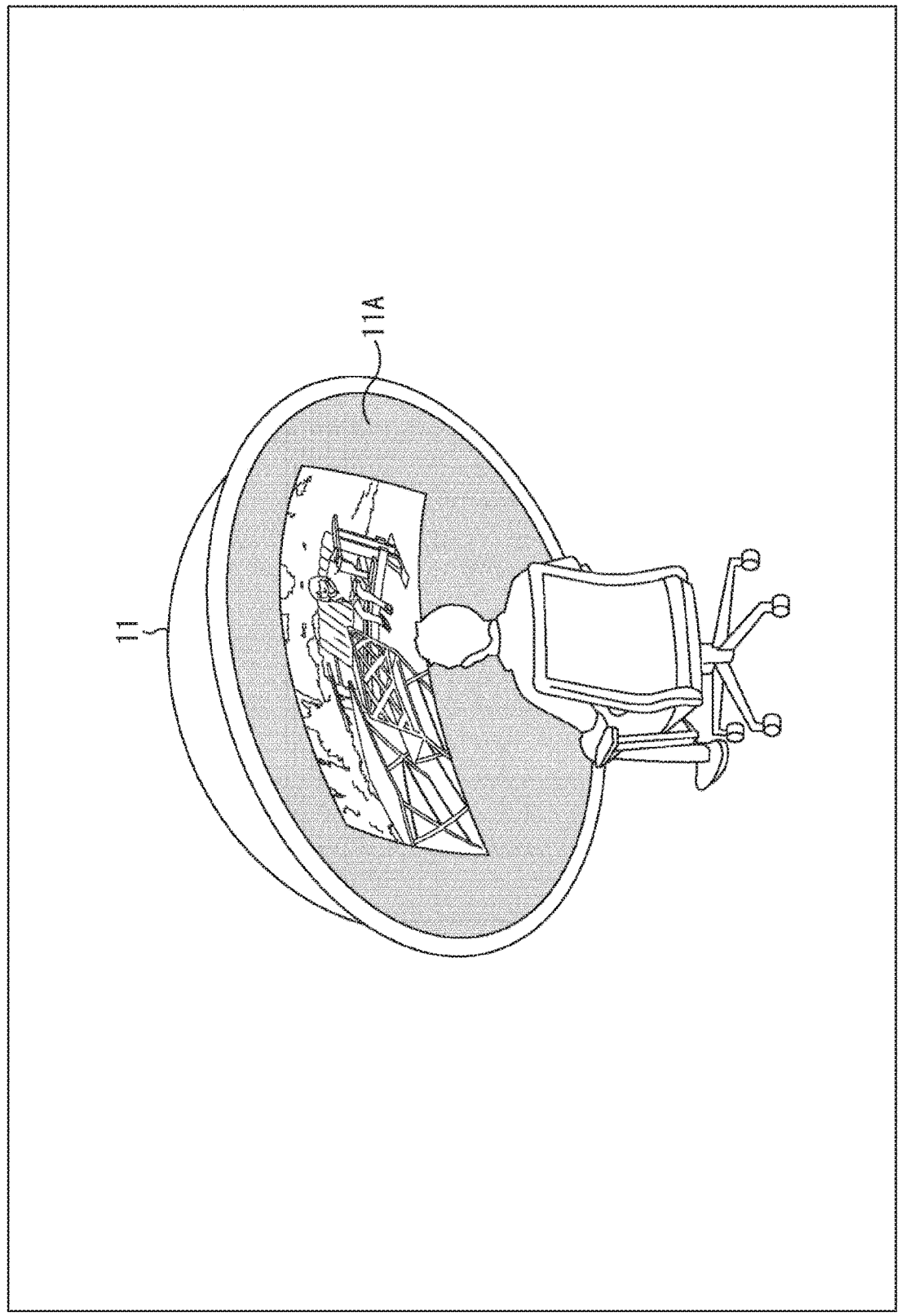

V
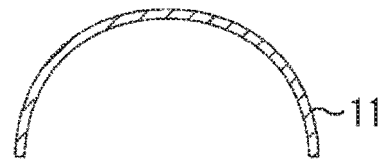
11
FIG. 13A
V
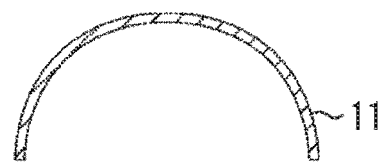
11
FIG. 13B

IMAGE PROCESSING APPARATUS, IMAGE PROCESSING METHOD AND PROJECTION SYSTEM

CROSS REFERENCE TO RELATED APPLICATIONS

This application is a U.S. National Phase of International Patent Application No. PCT/JP2019/000628 filed on Jan. 11, 2019, which claims priority benefit of Japanese Patent Application No. JP 2018-010191 filed in the Japan Patent Office on Jan. 25, 2018 and also claims priority benefit of Japanese Patent Application No. JP 2018-147567 filed in the Japan Patent Office on Aug. 6, 2018. Each of the above-referenced applications is hereby incorporated herein by reference in its entirety.

TECHNICAL FIELD

The present technology relates to an image processing apparatus, an image processing method, a program, and a projection system, and in particular, to an image processing apparatus, an image processing method, a program, and a projection system that can reduce a required space in the case of providing content of a planar image generated assuming that the image is displayed on a plane in such a manner that a sense of realism and immersion can be obtained.

BACKGROUND ART

There is a technology to project an image on a non-planar screen without distortion by using a projector. For example, there is a projection system that projects images from a plurality of projectors onto a dome-shaped screen.

As a method of capturing an image to be projected in such a projection system, a method of capturing an image by using a plurality of cameras each having wide-angle lenses is generally used. By performing image processing such as stitching and blending on images taken by a plurality of cameras, entire celestial sphere images in a format using the equidistant cylindrical projection or a format called a dome master are generated and used for projection.

The number of items of content of entire celestial sphere images is far smaller than the number of items of content of planar images supposed to be viewed using a flat display device, such as movies and television programs.

CITATION LIST

Patent Literature

[PTL 1]
  JP 2012-44407A

SUMMARY

Technical Problem

Incidentally, in order to provide the content of a planar image having a predetermined aspect ratio such as 16:9 in a form that makes a high sense of realism and immersion obtainable, a large flat screen is required.

The present technology has been made in view of such a situation, and it is intended to save space required in the case of providing the content of a planar image generated assuming that the image is displayed on a plane in such a manner that a sense of realism and immersion can be obtained.

Solution to Problem

An image processing apparatus according to one aspect of the present technology includes a calculating section that calculates a position of each of pixels on a curved display surface, each of the pixels forming a planar image generated on the assumption that the image is displayed on a plane, on the basis of a positional relationship between a viewpoint position set in front of the display surface and a virtual surface set behind the display surface, and a display control section configured to display the planar image on the display surface such that each of the pixels is displayed at the calculated position.

A projection system of another aspect of the present technology includes a screen having a curved projection surface, a projector configured to project an image on the screen, a calculating section configured to calculate a position of each of pixels on the projection surface of the screen, each of the pixels forming a planar image generated on the assumption that the image is displayed on a plane, on the basis of a positional relationship between a viewpoint position set in front of the screen and a virtual surface set behind the screen, and a display control section that causes the projector to project the planar image onto the projection surface such that each of the pixels is displayed at the calculated position.

In one aspect of the present technology, on the basis of the positional relationship between a viewpoint position set in front of a curved display surface and a virtual surface set behind the display surface, the position of each of pixels on the display surface is calculated, each of the pixels being included in a planar image generated assuming that the image is displayed on a plane, and the planar image is displayed on the display surface such that each of the pixels is displayed at the calculated position.

In another aspect of the present technology, on the basis of the positional relationship between a viewpoint position set in front of a screen having a curved projection surface and a virtual surface set behind the screen, the position of each of pixels on the projection surface of the screen is calculated, each of the pixels being included in the planar image generated assuming that the image is displayed on a plane, and the planar image is projected from the projector onto the projection surface such that each of the pixels is displayed at the calculated position.

Advantageous Effect of Invention

According to the present technology, the required space can be reduced in the case of providing the content of a planar image generated on the assumption that the image is displayed on a plane in a form that makes a sense of realism and immersion obtainable.

Note that the effect is not necessarily limited to the effects described here and may be any effects described in the present disclosure.

BRIEF DESCRIPTION OF DRAWINGS

FIG. 1 is a diagram illustrating a configuration example of a multi-projection system.

FIG. 2 is a diagram illustrating the positions of projectors viewed from above.
[FIG. 3]
FIG. 3 is a diagram illustrating an example of a viewpoint position.
FIGS. 4A and 4B illustrate diagrams of examples of images of content.
[FIG. 5]
FIG. 5 is a diagram illustrating a projection state.
FIG. 6 is a diagram illustrating a projection example of a planar image.
FIG. 7 is a diagram illustrating an example of the flow of processing up to the projection of a planar image.
FIG. 8 is a diagram illustrating an example of ray tracing.
FIG. 9 is a block diagram illustrating a hardware configuration example of an image processing apparatus.
FIG. 10 is a block diagram illustrating a functional configuration example of the image processing apparatus.
FIG. 11 is a diagram illustrating an example of filter processing.
FIG. 12 is a flowchart illustrating content reproduction processing of the image processing apparatus.
[FIGS. 13A and 13B]
FIGS. 13A and 13B illustrate diagrams of examples of selection of virtual screens.
FIG. 14 is a diagram illustrating another example of the shape of the virtual screen.
FIG. 15 is a diagram illustrating an example of projection of the planar image.
FIG. 16 is a diagram illustrating an example of processing a 3D image.
FIG. 17 is a diagram illustrating a projection example of a 3D image.
FIG. 18 is a diagram illustrating an example of the flow of processing up to the projection of a 3D image.

DESCRIPTION OF EMBODIMENT

Figure 1:
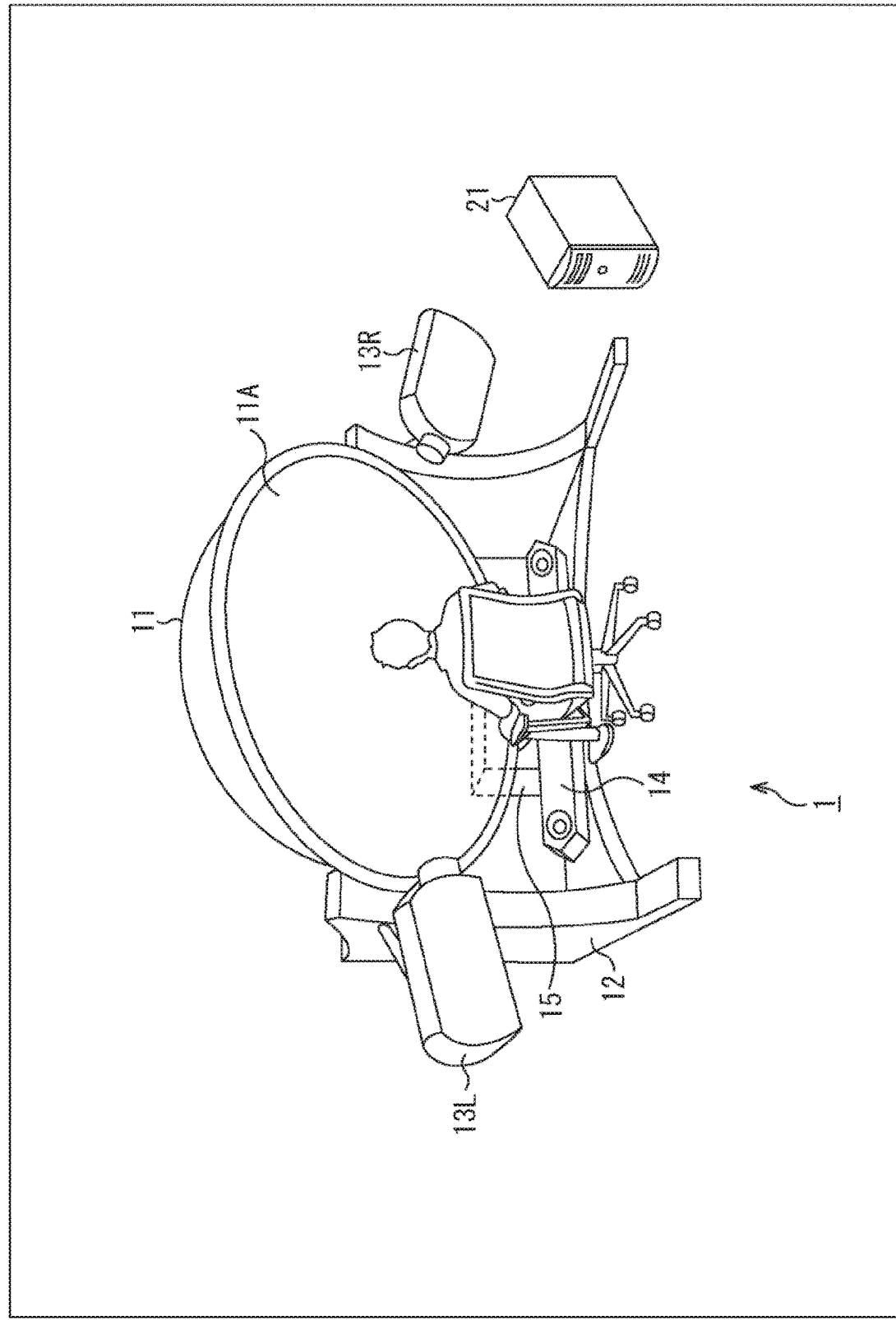
[FIG. 1]

Hereinafter, an embodiment for carrying out the present technology will be described. The description will be given in the following order.
 1. Configuration of a multi-projection system
 2. Regarding an image of content
 3. Projection processing of a planar image
 4. Configuration of an image processing apparatus
 5. Operation of the image processing apparatus
 6. Modification example
<Configuration of a Multi-Projection System>
FIG. 1 is a diagram illustrating a configuration example of a multi-projection system according to the embodiment of the present technology.
A multi-projection system 1 in FIG. 1 is configured by attaching a dome screen 11 having a dome-shaped (hemispherical) projection surface 11A having a diameter of approximately 2 meters to a mounting table 12. The dome screen 11 is attached at a height of approximately 1 meter with the opening directed obliquely downward.

As illustrated in FIG. 1, a chair is prepared in front of the dome screen 11. The user views and listens to the content projected on the projection surface 11A while sitting on the chair.

Further, the multi-projection system 1 is provided with projectors 13L and 13R, a surround speaker 14, a woofer 15, and an image processing apparatus 21. The projectors 13L and 13R, the surround speaker 14, and the woofer 15 are connected to the image processing apparatus 21 via wired or wireless communication.

The projectors 13L and 13R are attached to the left and right of the dome screen 11 with their image projection portions facing the dome screen 11.

Figure 2:
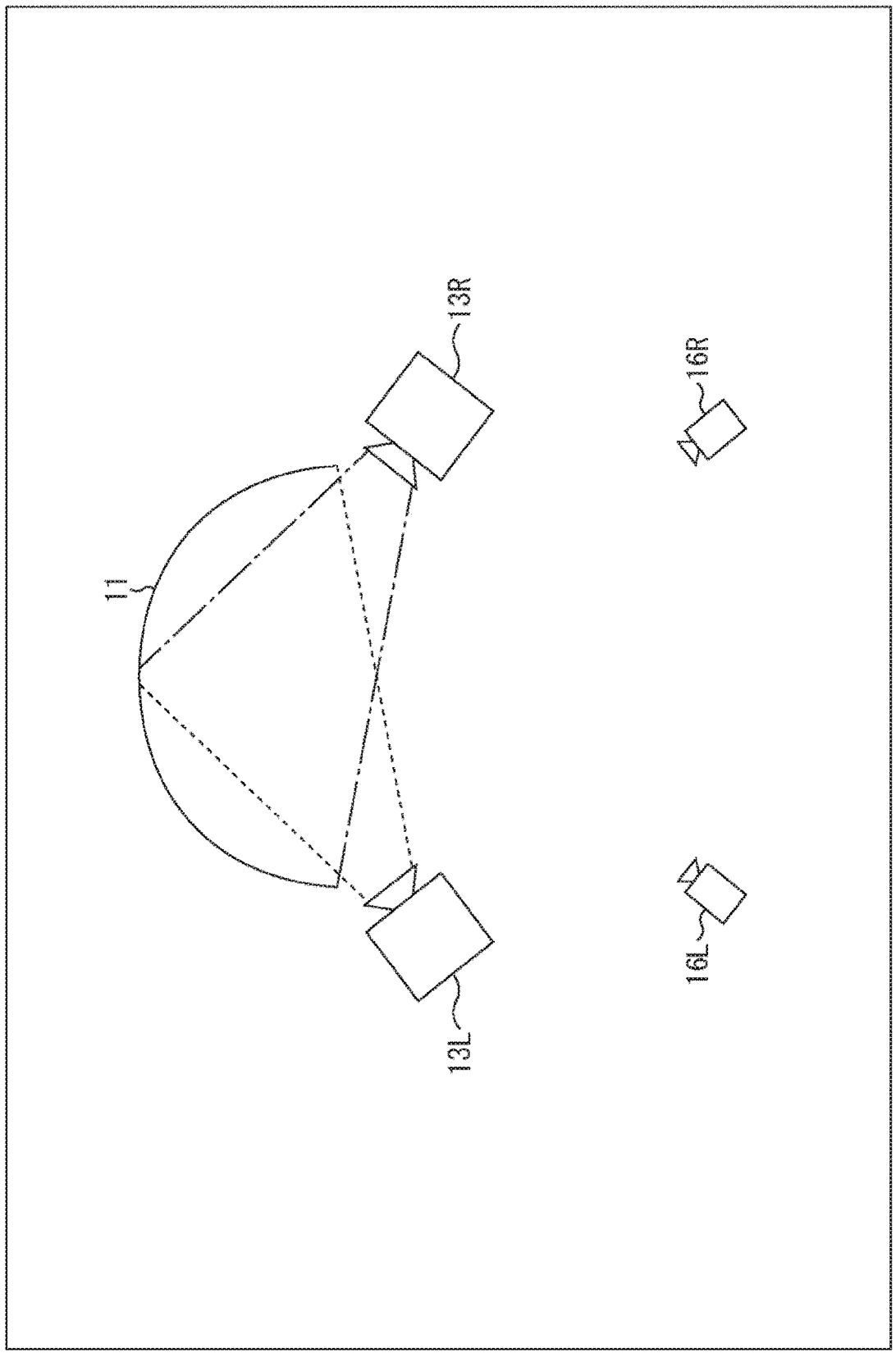
[FIG. 2]

FIG. 2 is a diagram illustrating the positions of the projectors 13L and 13R viewed from above.

As illustrated in FIG. 2, the projector 13L is mounted at a position so as to be capable of projecting an image on the right half area of the dome screen 11, and the projector 13R is mounted at a position so as to be capable of projecting an image on the left half area of the dome screen 11. In FIG. 2, the range indicated by the broken line represents the projection range of the projector 13L, and the range indicated by the alternate long and short dash line represents the projection range of the projector 13R.

The projectors 13L and 13R project the projection images assigned to the respective projectors 13L and 13R to display the image of the content on the entire projection surface 11A to present the content to the user. The projection image of each projector is generated on the basis of the image of the content such that one image can be viewed without distortion from the viewpoint of the user.

The surround speaker 14 and the woofer 15 provided below the dome screen 11 output the sound of the content reproduced by the image processing apparatus 21.

The multi-projection system 1 is also provided with cameras 16L and 16R (FIG. 2). For example, the cameras 16L and 16R are provided at positions such that the shooting range includes the user who is viewing and listening to the content. The captured image obtained by capturing images of the appearance of the user who is viewing and listening to the content is transmitted from the cameras 16L and 16R to the image processing apparatus 21 via wired or wireless communication.

The image processing apparatus 21 reproduces the content and generates a projection image of each projector on the basis of each frame forming the moving image of the content. The image processing apparatus 21 outputs the projection images to the respective projectors 13L and 13R and causes the projectors to project the images toward the projection surface 11A.

Further, the image processing apparatus 21 outputs the audio data obtained by reproducing the content to the surround speaker 14 and the woofer 15 and causes these to output the audio of the content.

The image processing apparatus 21 is a PC, for example. The image processing apparatus 21 may be configured by a plurality of PCs instead of a single PC. Further, the image processing apparatus 21 may be provided not in the vicinity of the dome screen 11 as illustrated in FIG. 1 but in a room different from the room in which the dome screen 11 is installed.

In addition, although two projectors are provided in the example of FIG. 1, one projector may be provided or three or more projectors may be provided. Any number of projectors can be provided in the multi-projection system 1.

FIG. 3 is a diagram illustrating an example of viewpoint position.

A user sitting in a chair placed in front of the dome screen 11 looks up slightly to view the image projected on the projection surface 11A, as indicated by a dashed arrow, with a position P1 near the center of the sphere as the viewpoint position when the projection surface 11A is a sphere surface. The position of the innermost portion of the projection surface 11A illustrated ahead of the dashed arrow in FIG. 3 is the center position of the projection surface 11A.

By viewing the projection image while looking up with the position P1 as the viewpoint position, the visual field of the user is almost covered by the image projected on the projection surface 11A. Since the image covers almost the entire visual field, the user is given the impression of being surrounded by the image and can feel the realism and immersion of the content.

For example, moving image content such as a movie, a television program, and a game is provided. Still image content such as a photograph of a landscape may also be provided.

<Regarding an image of content>

Figure 4A:
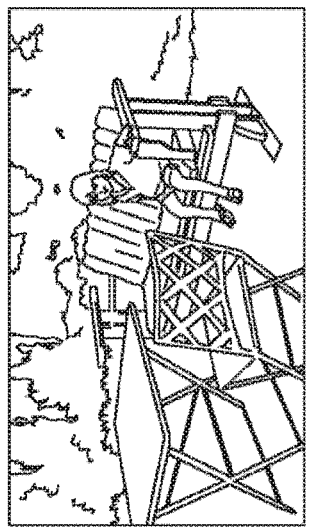
[FIGS. 4A and 4B]
Figure 4B:
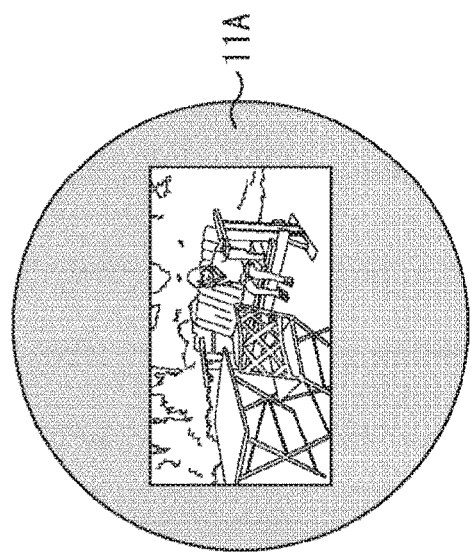

FIGS. 4A and 4B illustrate diagrams of examples of images of content.

The horizontally long rectangular image illustrated of FIG. 4A is a one-frame image obtained by reproducing the movie content. At the time of reproducing the content of the movie, for example, the image of each frame in which the ratio of the horizontal length to the vertical length is 16:9 is presented to the user.

The image obtained by reproducing the content is a planar image generated on the assumption that the image is displayed on a plane display or projected on a plane screen.

Incidentally, in the case where the planar image is directly projected onto the projection surface 11A, the planar image is projected in a distorted state. In the image processing apparatus 21, geometric transform of the planar image is performed on the basis of the geometric information in which each pixel of the planar image obtained by reproducing the content is associated with each position on the projection surface 11A, and images in an undistorted state are projected and viewed when the position P1 is set to be the viewpoint position.

As a result, when the position P1 is set as the viewpoint position, a space is created virtually as if a flat screen having a predetermined size were in front.

The image illustrated in FIG. 4B is a projection image including only a planar image. In the case where the planar image is projected so as to be entirely fitted on the projection surface 11A having a circular shape in a front view, a black area in which nothing is displayed is formed around the planar image.

FIG. 5 is a diagram illustrating a projection state.

As illustrated in FIG. 5, a planar image is projected in a form in which the peripheral visual field is limited on the dome screen 11 in the direction of the gaze of the user sitting on the chair. For example, by projecting widely a planar image obtained by reproducing movie content in front of the user, the user can get a feeling of realism and immersion as if the user were watching a movie on a large screen such as in a movie theater.

The multi-projection system 1 can give such a sense of realism and immersion to the user with the dome screen 11 having a size smaller than that of a screen actually installed in a movie theater or the like.

Further, by using the content including the image generated on the assumption that the image is displayed on a plane, the number of items of content that can be reproduced in the multi-projection system 1 having the dome screen 11 can be increased.

<Projection Processing of a Planar Image>

Figure 6:
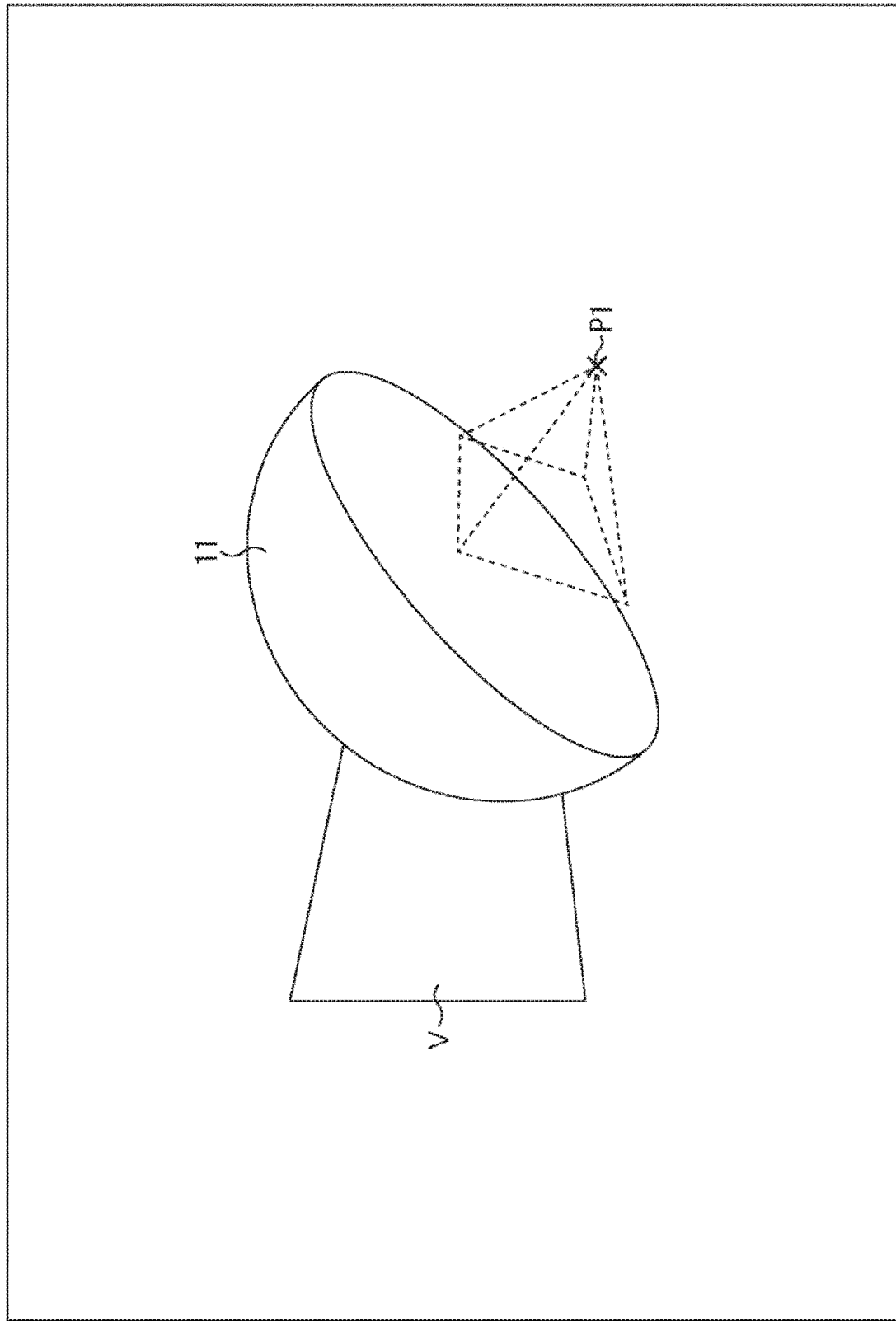
[FIG. 6]

FIG. 6 is a diagram illustrating an example of projection of a planar image.

The image obtained by reproducing the content is a planar image generated on the assumption that the image is displayed on a plane as described above. In the case where the planar image is projected on the curved projection surface 11A as it is, the display content appears distorted.

In the image processing apparatus 21, as illustrated in FIG. 6, a virtual screen V that is a virtual plane screen is set behind the dome screen 11, and ray tracing is performed on the basis of the positional relationship among the projection surface 11A, the virtual screen V, and the viewpoint position.

By performing ray tracing, the position of each of pixels forming the planar image is set on the projection surface 11A, and the planar image is projected such that each of the pixels is displayed at the set position. This makes it possible to prevent the planar image from appearing distorted.

Figure 7:
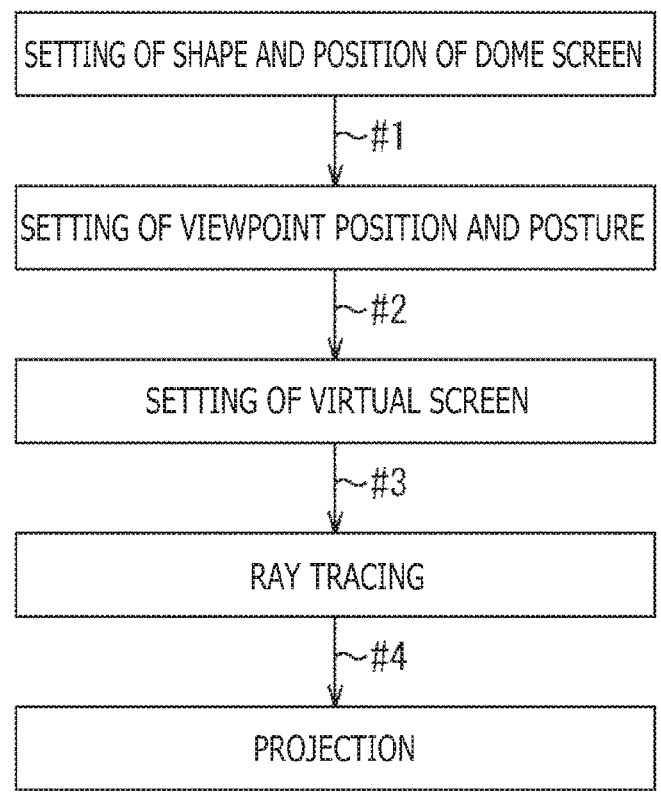
[FIG. 7]

FIG. 7 is a diagram illustrating an example of the flow of processing up to the projection of a planar image.

As illustrated at the top of FIG. 7, the shape and position of the dome screen 11 are set in the image processing apparatus 21. The shape of the dome screen 11 includes the size of the dome screen 11. Information regarding the shape and position of the dome screen 11 is input by the administrator of the multi-projection system 1 as design information of the multi-projection system 1, for example.

The position and shape of the dome screen 11 may be measured by three-dimensional measurement, and the information obtained by the measurement may be set in the image processing apparatus 21. Three-dimensional measurement is performed, for example, by projecting an image having a predetermined pattern from the projectors 13L and 13R, capturing the pattern projected on the projection surface 11A by the cameras 16L and 16R, and analyzing the images obtained by capturing the pattern.

After the shape and position of the dome screen 11 are set, the viewpoint position and posture of the user are set in the image processing apparatus 21 as indicated at the position ahead of arrow #1. The viewpoint position and posture of the user may be determined fixedly in advance to be input by the administrator of the multi-projection system 1.

For example, the viewpoint position is set as the position P1 near the center of the sphere when the projection surface 11A is the surface of the sphere. Further, the direction of the user's gaze from the position P1 toward the center of the projection surface 11A is set as the posture of the user.

The face of the user may be identified on the basis of the images captured by the cameras 16L and 16R, the viewpoint position may be set on the basis of the position of the identified face, and the posture may be set on the basis of the direction of the face. As will be described later, face identification is repeatedly performed during content reproduction, and the setting of the viewpoint position and posture is updated in real time.

After the viewpoint position and posture of the user are set, the size and position of the virtual screen V are set in the image processing apparatus 21 by the administrator of the multi-projection system 1, for example, as indicated at the position ahead of arrow #2.

The size and position of the virtual screen V may be automatically determined and set on the basis of the size of the dome screen 11 and the viewpoint position. Further, the projection size and position of the planar image may be selected by the user, and the size and position of the virtual screen V may be set according to the selection result of the user.

After the size and position of the virtual screen V are set, ray tracing is performed as illustrated at the position ahead of arrow #3, and the position of each of pixels forming the planar image is set on the projection surface 11A.

Figure 8:
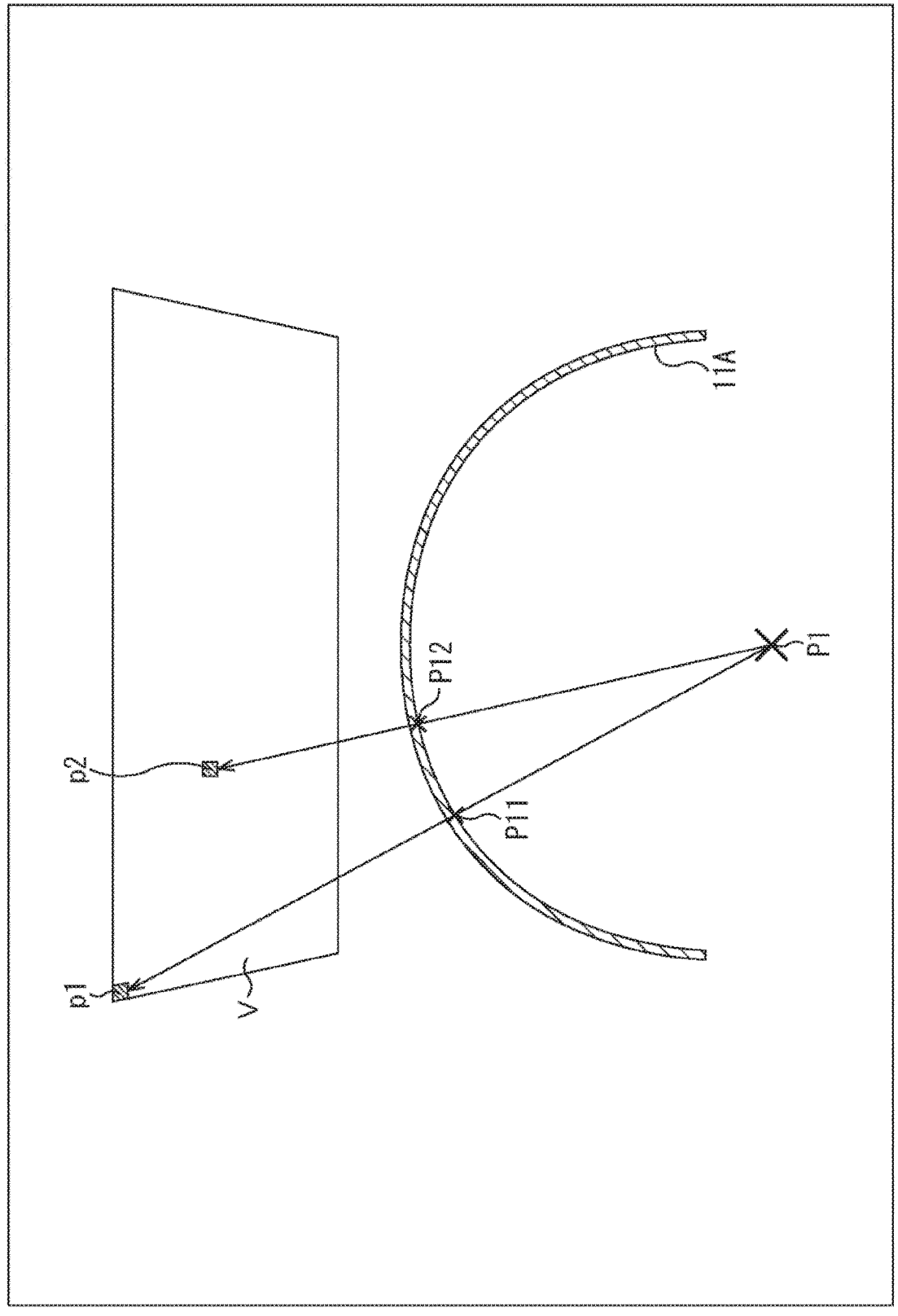
[FIG. 8]

FIG. 8 is a diagram illustrating an example of ray tracing.

For example, a straight line connecting each pixel of the planar image virtually displayed on the virtual screen V and the position P1 which is the viewpoint position is set, and a position where the straight line connecting each of pixels and the position P1 intersects the projection surface 11A is set as the projection position of each of the pixels.

In the example of FIG. 8, the projection position of a pixel p1 which is the pixel at the upper left end position (0, 0) of the planar image of 1920×1080 pixels is set as a position P11. Further, the projection position of a pixel p2 located at the lower right position (x, y) of the pixel p1 is set as a position P12.

Such ray tracing is performed on each of pixels forming the planar image, and the projection position of each of the pixels is set. The ray tracing need not be performed on all the pixels forming the planar image, and thus, the ray tracing may be performed on the pixels at predetermined positions such as the pixels at the four corners to set the projection position.

After the ray tracing is performed, the planar image obtained by reproducing the content is projected as illustrated at the position ahead of arrow #4 in FIG. 7. The projection of the planar image is performed by projecting each pixel of the planar image to the position set by the ray tracing.

As a result, in the case of being viewed from the position P1, the planar image appears to be projected on the virtual screen V. The display content in the planar image does not appear distorted.

A series of operations of the image processing apparatus 21 that provides the content as described above will be described later with reference to a flowchart.

<Configuration of an Image Processing Apparatus>

Figure 9:
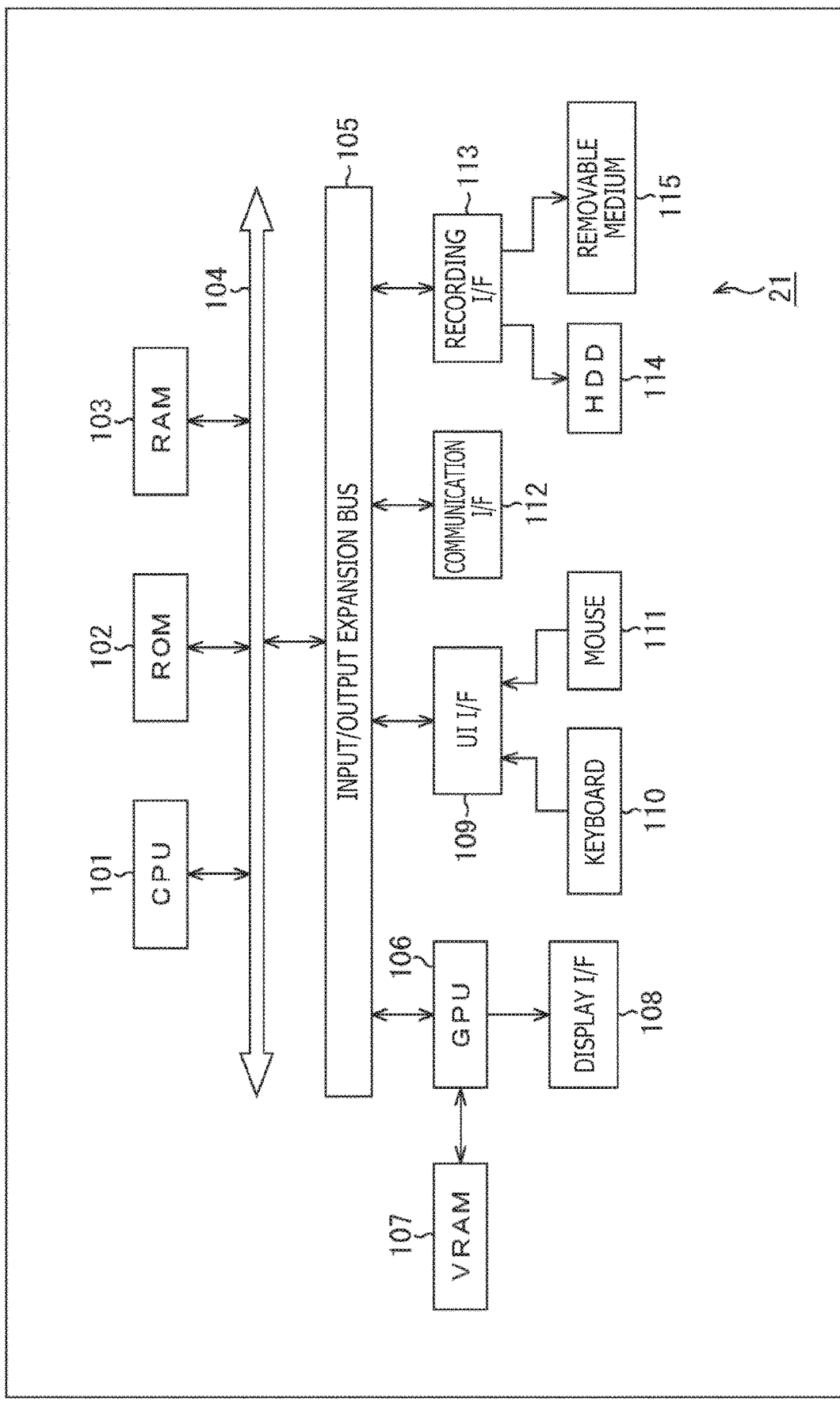
[FIG. 9]

FIG. 9 is a block diagram illustrating a hardware configuration example of the image processing apparatus 21.

A CPU (Central Processing Unit) 101, a ROM (Read Only Memory) 102, and a RAM (Random Access Memory) 103 are connected to one another by a bus 104.

An input/output expansion bus 105 is further connected to the bus 104. A GPU (Graphics Processing Unit) 106, a UI (User Interface) I/F 109, a communication I/F 112, and a recording I/F 113 are connected to the input/output expansion bus 105.

The GPU 106 uses a VRAM 107 to perform rendering of the projection image to be projected by the projectors 13L and 13R. For example, the GPU 106 generates a projection image to be projected by each of the projector 13L and the projector 13R. The projection image generated by the GPU 106 is supplied to a display I/F 108.

The display I/F 108 is an interface for outputting a projection image. For example, the display I/F 108 is configured as an interface of a predetermined standard such as an HDMI (registered trademark) (High-Definition Multimedia Interface). The display I/F 108 outputs the projection image supplied from the GPU 106 to the projector 13L and the projector 13R for projecting the image.

The UI I/F 109 is an interface for detecting an operation. The UI I/F 109 detects an operation performed using a keyboard 110 or a mouse 111 and outputs information indicating the content of the operation to the CPU 101. The operation using the keyboard 110 or the mouse 111 is performed by an administrator or a user of the multi-projection system 1, for example.

The communication I/F 112 is an interface for communication with an external apparatus. The communication I/F 112 includes a network interface such as a wireless LAN and a wired LAN. The communication I/F 112 communicates with an external apparatus via a network such as the Internet, and transmits and receives various kinds of data. The content reproduced in the multi-projection system 1 may be provided from the server via the network.

The communication I/F 112 appropriately transmits the sound data of the content to the surround speaker 14 and the woofer 15 or receives the image data captured by the cameras 16L and 16R and transmitted from the cameras 16L and 16R. In the case where a sensor or the like for detecting the movement of the user is provided on the chair, the communication I/F 112 also receives the sensor data transmitted from the sensor.

The recording I/F 113 is an interface for recording media. A recording medium such as an HDD 114 and a removable medium 115 is attached to the recording I/F 113. The recording I/F 113 reads out the data recorded in the attached recording medium and writes the data in a recording medium. In the HDD 114, various kinds of data such as a program executed by the CPU 101 are recorded in addition to the content.

Figure 10:
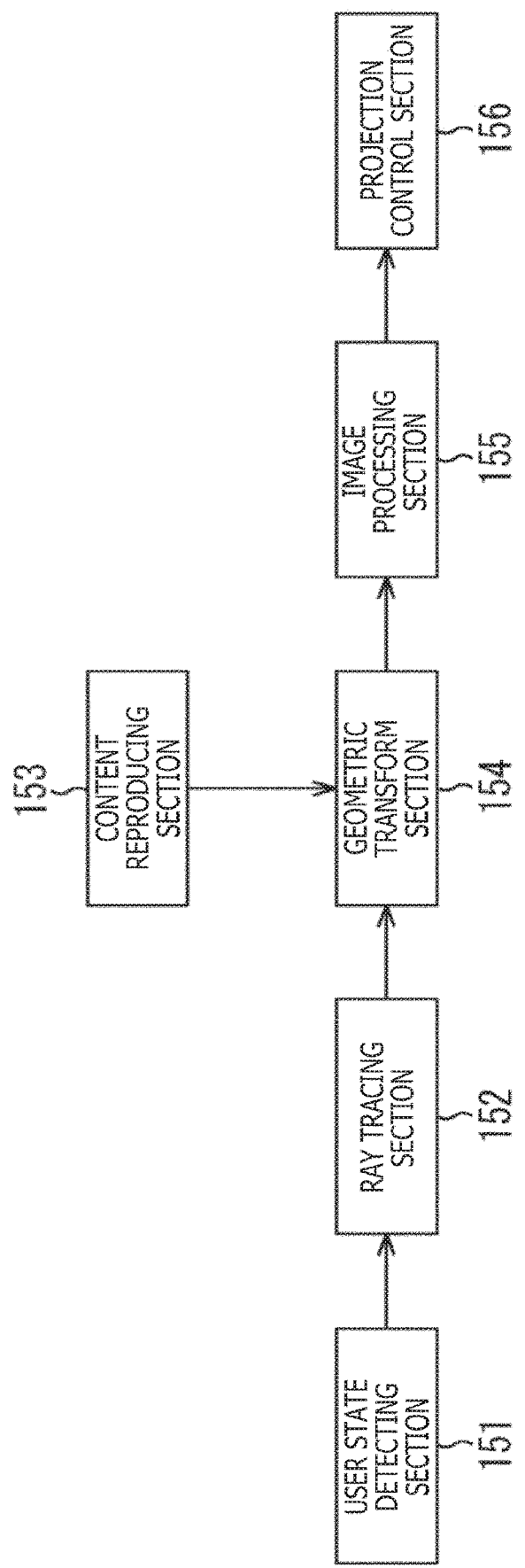
[FIG. 10]

FIG. 10 is a block diagram illustrating a functional configuration example of the image processing apparatus 21.

As illustrated in FIG. 10, in the image processing apparatus 21, a user state detecting section 151, a ray tracing section 152, a content reproducing section 153, a geometric transform section 154, an image processing section 155, and a projection control section 156 are configured. At least some of the functional sections illustrated in FIG. 10 is implemented with the CPU 101 in FIG. 9 executing a predetermined program.

The user state detecting section 151 detects the state of the user who is viewing and listening to the content, such as the direction of the user's gaze and the orientation of the face. On the basis of the state of the user detected by the user state detecting section 151, the viewpoint position of the user and the posture of the user, which are described with reference to FIG. 7, are set.

The state of the user is detected, for example, by analyzing the images captured by the cameras 16L and 16R. The user state detecting section 151 outputs information indicating the state of the user to the ray tracing section 152.

The ray tracing section 152 performs ray tracing as described with reference to FIG. 8 and sets the position of each of pixels forming the planar image on the projection surface 11A. Information regarding the shape and position of the dome screen 11 and information regarding the size and position of the virtual screen V are set for the ray tracing section 152 according to an operation by an administrator of the multi-projection system 1, for example. The ray tracing section 152 functions as a calculating section that calculates the positions of the pixels forming the planar image on the projection surface 11A by performing ray tracing.

The ray tracing section 152 uses the pieces of information set by the administrator of the multi-projection system 1 and the information regarding the viewpoint position and posture of the user represented by the information supplied from the user state detecting section 151 to perform ray tracing. The ray tracing section 152 outputs information indicating the position of each of the pixels forming the planar image on the projection surface 11A, which is set by performing ray tracing, to the geometric transform section 154.

The content reproducing section 153 reproduces content such as a movie and outputs the planar image obtained by the reproduction to the geometric transform section 154. The content reproducing section 153 is supplied with content transmitted from the server and received by the communication I/F 112 or content read out from the HDD 114 by the recording I/F 113.

The geometric transform section 154 performs the geometric transform on the planar image supplied from the content reproducing section 153 on the basis of the information supplied from the ray tracing section 152. The planar image after the geometric transform becomes an image in which each pixel is displayed at the position set by the ray tracing. The geometric transform section 154 outputs the planar image after the geometric transform to the image processing section 155.

The image processing section 155 performs various kinds of image processing such as super-resolution processing and color conversion on the planar image supplied from the geometric transform section 154. The image processing section 155 also appropriately performs filter processing while taking into consideration that the projection surface 11A is a curved surface. By performing the filter processing, the pixel value of each pixel of the planar image is converted using the parameter corresponding to the position on the projection surface 11A.

Figure 11:
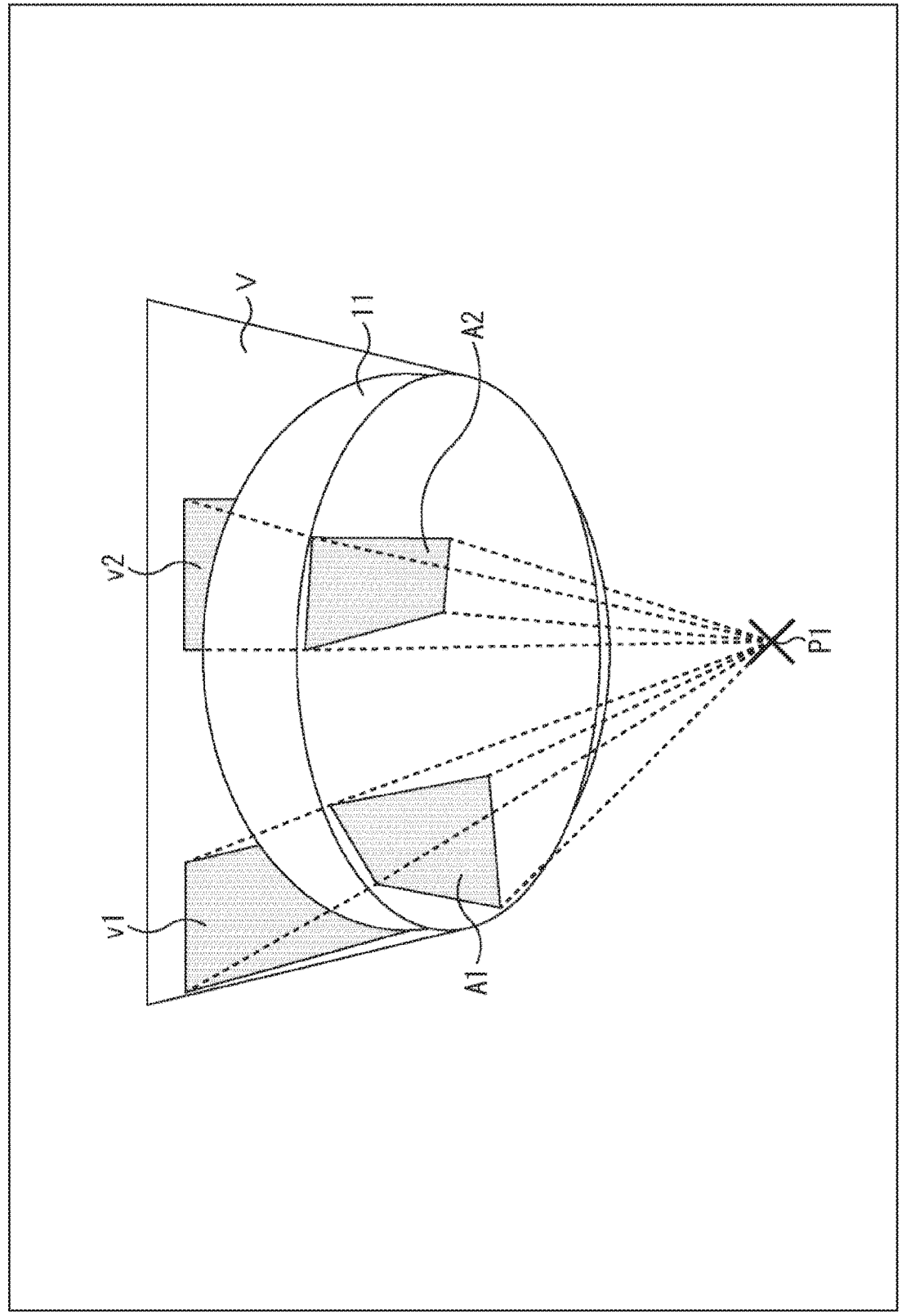
[FIG. 11]

FIG. 11 is a diagram illustrating an example of filter processing.

As illustrated in FIG. 11, in the case where it is assumed that a planar image is projected on the entire virtual screen V, each area of the planar image is projected on the projection surface 11A at different enlargement/reduction ratios according to the position of the area.

In the example of FIG. 11, an area v1 near the left end of the planar image is projected onto an area A1 near the edge of the projection surface 11A at a predetermined enlargement/reduction ratio. Further, an area v2 near the center of the planar image is projected onto an area A2 near the center of the projection surface 11A at an enlargement/reduction ratio different from that of the area v1.

The filter processing performed by the image processing section 155 is carried out by using different parameters depending on the position on the projection surface 11A such that the appearance in each area does not cause uncomfortable feeling even when projection is performed at different enlargement/reduction ratios.

To return to the description of FIG. 10, the image processing section 155 generates a projection image for the projector 13L and a projection image for the projector 13R on the basis of the planar image after the image processing including the filter processing, and outputs the projection images to the projection control section 156.

By controlling the display I/F 108, the projection control section 156 outputs the projection image for the projector 13L to the projector 13L and outputs the projection image for the projector 13R to the projector 13R. The projection control section 156 functions as a display control section that controls the display of the planar image obtained by reproducing the content.

<Operation of the Image Processing Apparatus>

Here, the content reproduction processing of the image processing apparatus 21 having the above configuration will be described with reference to the flowchart of FIG. 12.

In step S1, the user state detecting section 151 detects the state of the user by analyzing the images captured by the cameras 16L and 16R and measures the viewpoint position of the user on the basis of the state of the user, for example.

In step S2, the ray tracing section 152 sets the virtual screen V of a predetermined size at a predetermined position behind the projection surface 11A according to an operation by the administrator of the multi-projection system 1.

In step S3, the ray tracing section 152 performs ray tracing of each pixel of the planar image virtually displayed on the virtual screen V and sets the position of each pixel of the planar image on the projection surface 11A. Information representing the position of each pixel of the planar image on the projection surface 11A as a result of ray tracing is supplied to the geometric transform section 154.

In step S4, the content reproducing section 153 reproduces content such as a movie. The planar image obtained by reproducing the content is supplied to the geometric transform section 154.

In step S5, the geometric transform section 154 performs the geometric transform on the planar image supplied from the content reproducing section 153 on the basis of the result of the ray tracing supplied from the ray tracing section 152.

In step S6, the image processing section 155 performs image processing including the super-resolution processing, color conversion, and above-described filter processing, which is performed while taking into consideration that the projection surface 11A is a curved surface, with respect to the planar image supplied from the geometric transform section 154. The image processing section 155 generates a projection image for the projector 13L and a projection image for the projector 13R on the basis of the planar image subjected to the image processing including the filter processing, and outputs the projection images to the projection control section 156.

In step S7, the projection control section 156 causes the projector 13L and the projector 13R to project the projection images.

In step S8, the user state detecting section 151 detects the state of the user and measures the viewpoint position of the user again.

In step S9, the content reproducing section 153 determines whether or not the reproduction of the content has ended. In the case where it is determined in step S9 that the reproduction of the content has not ended, the processes in step S3 and the subsequent steps are repeated. In the processes in step S3 and the subsequent steps, ray tracing is performed again on the basis of the viewpoint position according to the current state of the user, and the planar image is projected after the position of each pixel is updated in real time.

Figure 12:
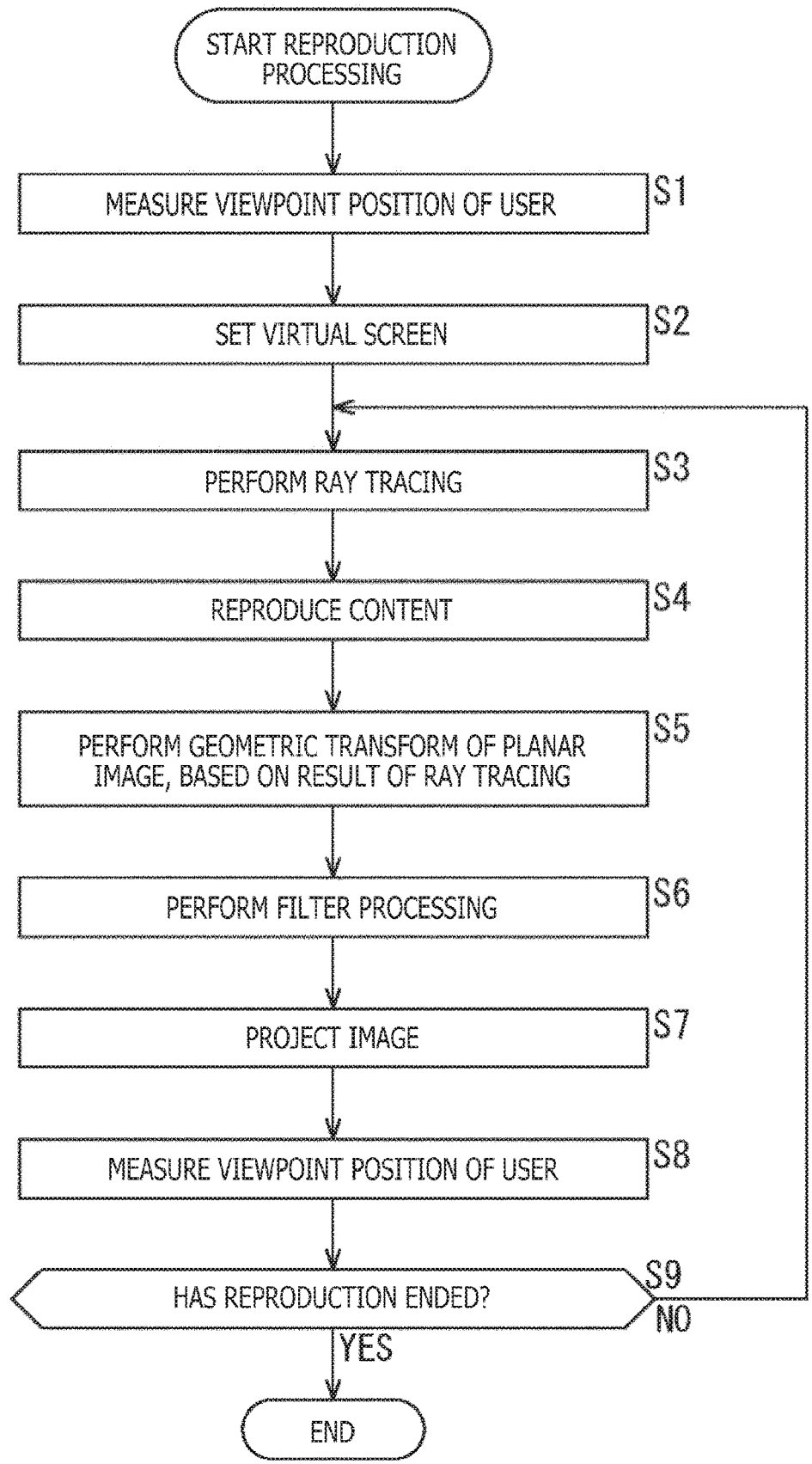
[FIG. 12]

On the other hand, in the case where the termination of reproduction of the content is selected in step S9, the process of FIG. 12 is ended.

By the above processing, even in the case of reproducing the content including the image generated on the assumption that the image is displayed on a plane, the image processing apparatus 21 effectively utilizes the projection surface 11A on the dome screen 11 and can express an image that makes it easier to get a feeling of realism and immersion.

In a projection system provided with a flat screen, a large screen is required in the case where the content is supposed to be provided in a form that covers the user's field of view and that makes easy to get a sense of realism and immersion.

Since the dome-shaped screen is used in the multi-projection system 1, the required space can be reduced even in the case of providing the content in such a manner that it is easy to get a sense of realism and immersion.

Further, by using the content including the image generated on the assumption that the image is displayed on a plane, the number of items of content that can be reproduced in the multi-projection system 1 having the dome screen 11 can be increased.

Modification Example

Example of Virtual Screen Selection

The user may be allowed to select a predetermined virtual screen from a plurality of virtual screens that differs in at least one of the distance from the user's viewpoint position, the size, or the position.

FIG. 13A illustrates a large-sized virtual screen V set at a position separated from the viewpoint position by a predetermined distance. Further, FIG. 13B illustrates a small-sized virtual screen V set at a position farther than the virtual screen V in FIG. 13A.

As described above, the information regarding the setting of the virtual screens V having different distances, sizes, and the like may be prepared in the image processing apparatus 21 to be used for the user's selection. Ray tracing is performed on the basis of the distance, size, etc. of the selected virtual screen V, so that the user can view the content with a desired sense of depth and size.

Although it has been assumed that a small dome-shaped screen is used as the display device, a self-luminous display device such as a curved display configured by pasting a plurality of panels on which LED elements are arranged or an organic EL display with its display surface curved can also be employed.

Although it has been assumed that the projection surface 11A of the dome screen 11 has a substantially hemispherical dome shape, curved surfaces with various curvatures and angles of view as the shape of the projection surface 11A can be adopted.

Example of Virtual Screen Shape

Although it has been assumed that the shape of the virtual screen is flat, other shapes may be used.

Figure 14:
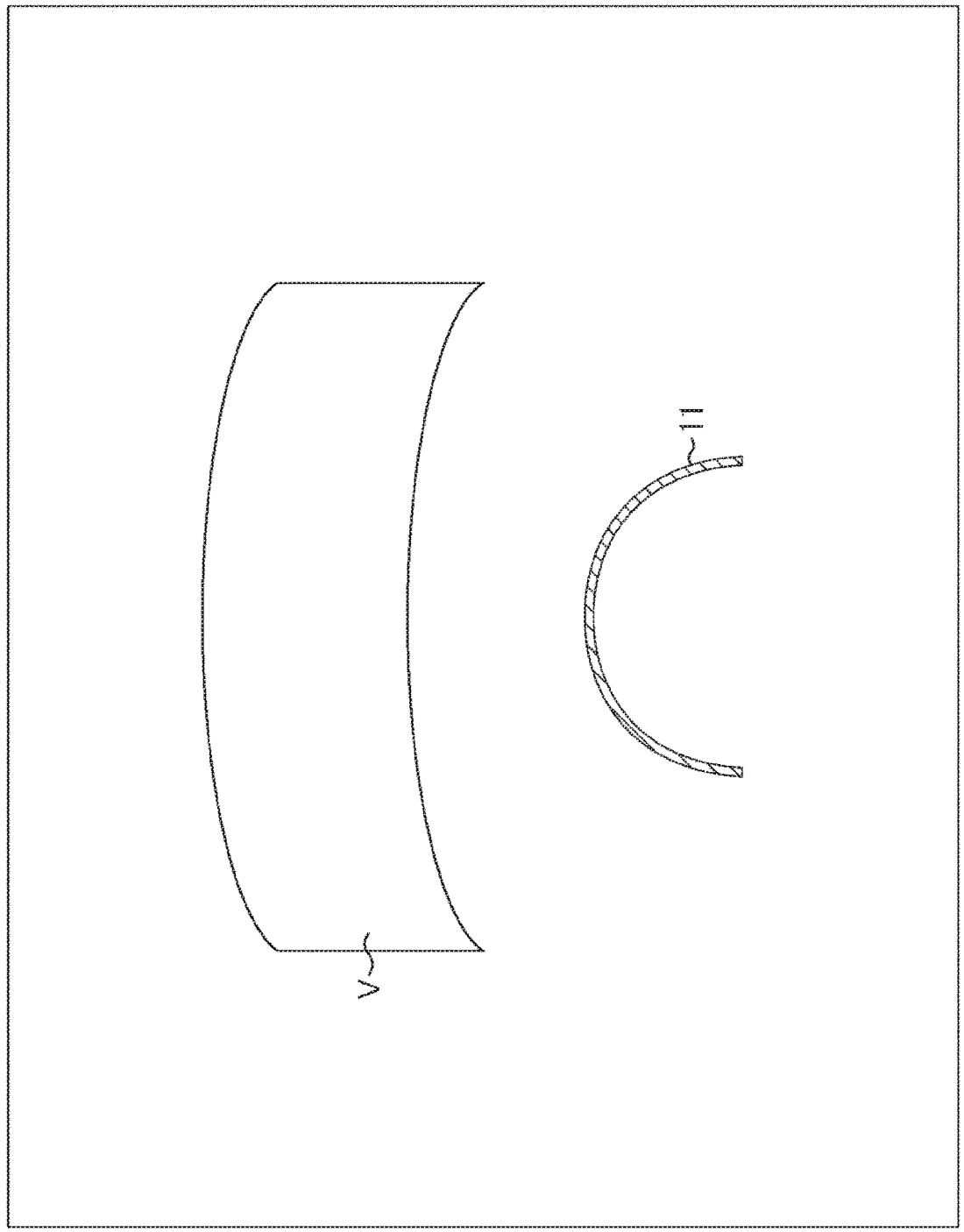
[FIG. 14]

FIG. 14 is a diagram illustrating another example of the shape of the virtual screen.

In the example of FIG. 14, a screen having a cylindrical shape (a circumferential side surface shape of a cylinder) is set as the virtual screen V.

Figure 15:
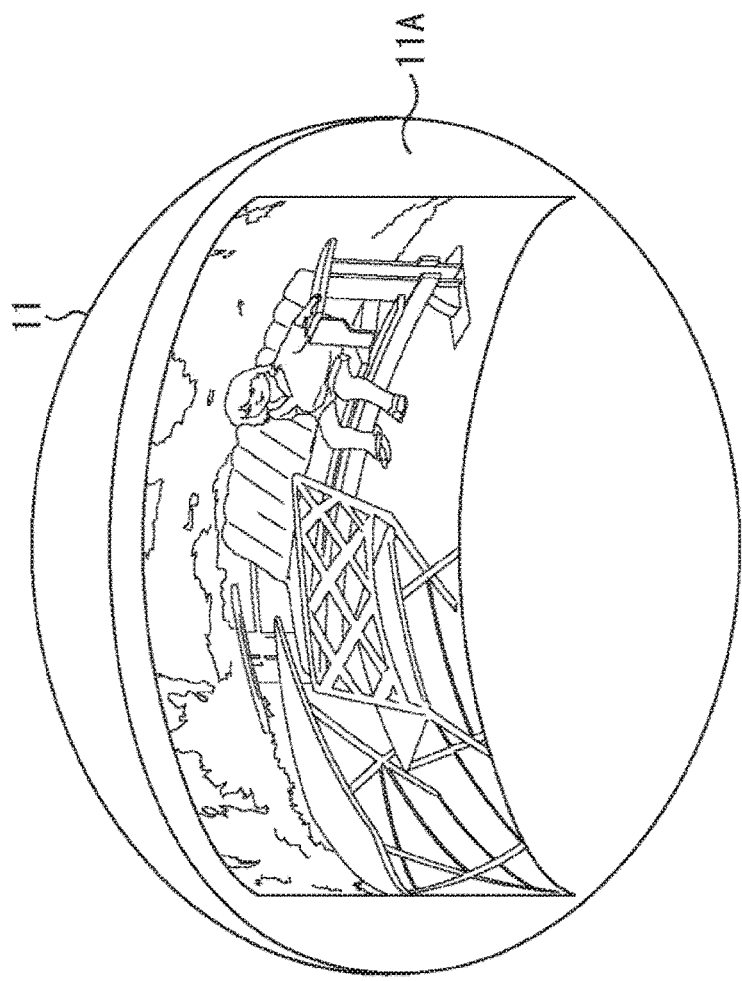
[FIG. 15]

In such a way, even in the case where the shape of the virtual screen V has a shape other than a plane, ray tracing is similarly performed, and the position of each pixel of the planar image on the projection surface 11A is calculated. On the basis of the calculated position, the projection of the planar image is performed as illustrated in FIG. 15. This also enables the projection to provide a sense of realism and immersion.

Since the image to be projected is a planar image and ray tracing is performed on the basis of the state where the image is projected on the virtual screen V that is not a plane, the image projected on the projection surface 11A includes a slight distortion as compared with the case where the shape of the virtual screen is flat.

In such a way, the virtual screen can have a shape other than a plane. A virtual screen having a combination of flat and curved surfaces may be used.

Example of a Planar Image to be Projected

A 3D image, which is an image that can be displayed in 3D (stereoscopic display), can also be used, as the planar image to be projected.

Figure 16:
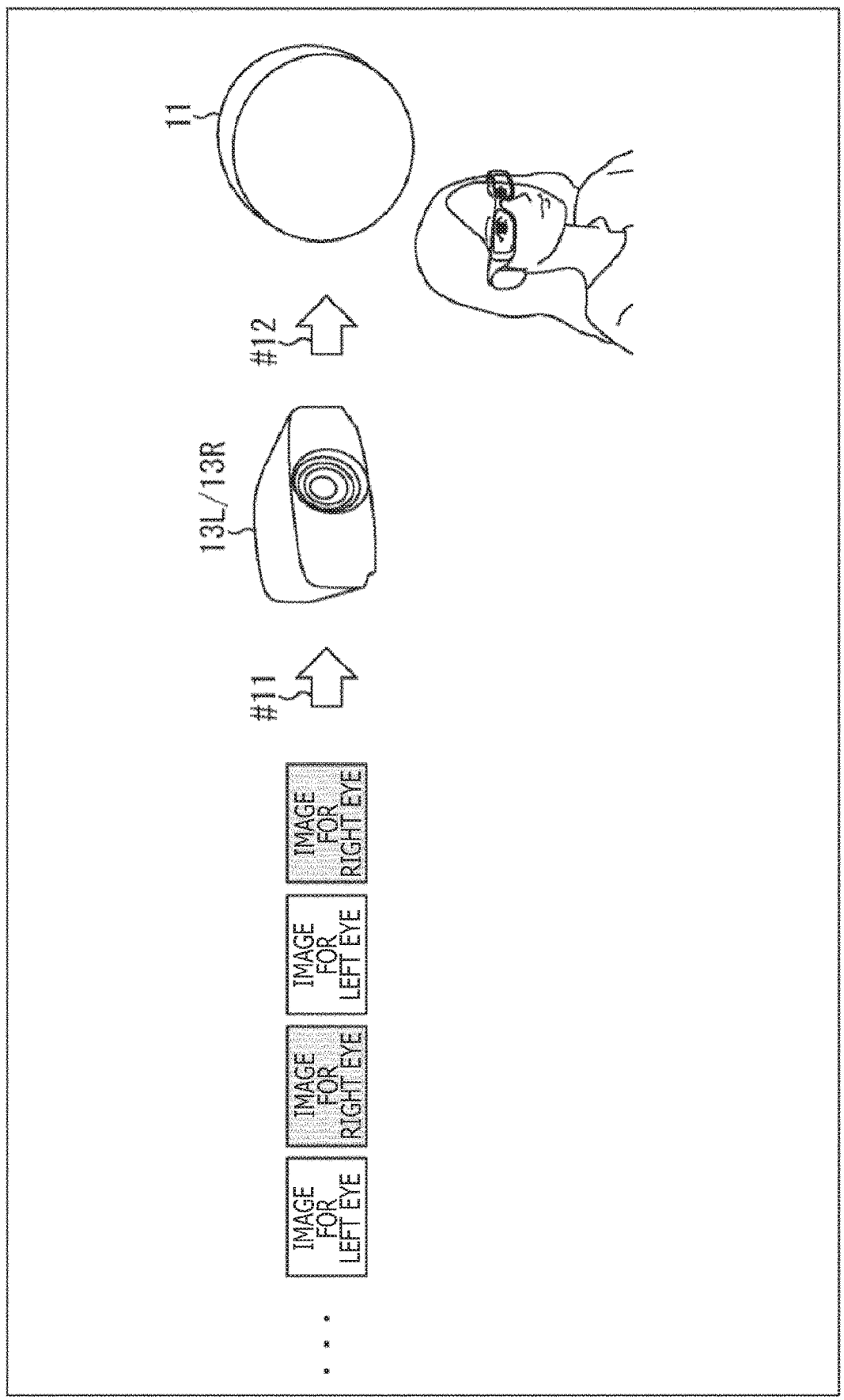
[FIG. 16]

FIG. 16 is a diagram illustrating an example of processing a 3D image.

In the case of projecting a 3D image, the 3D images generated by the image processing apparatus 21 are input to the projectors 13L and 13R as indicated at the position ahead of arrow #11. The 3D image includes an image for the left eye and an image for the right eye for which parallax is set.

In each of the projectors 13L and 13R, the image for the left eye and the image for the right eye are alternately projected, as indicated at the position ahead of arrow #12. The user views the content by wearing glasses corresponding to the viewing of 3D images.

Figure 17:
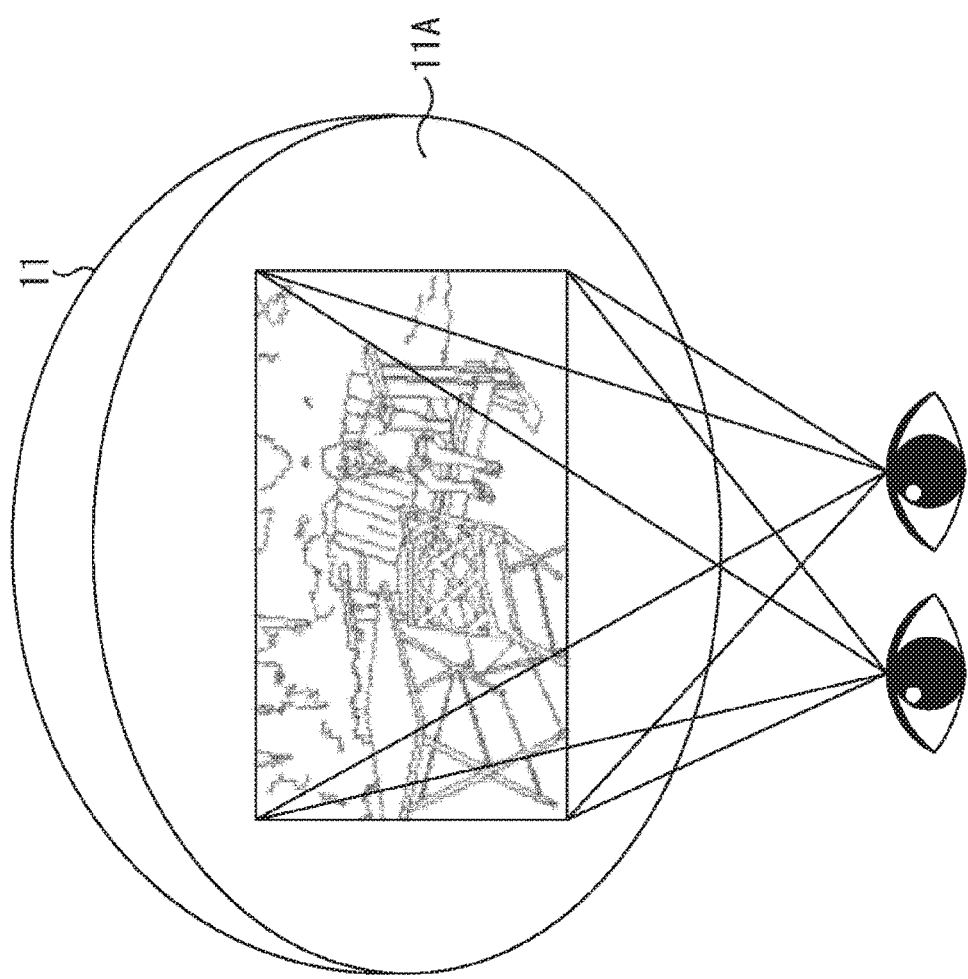
[FIG. 17]

As illustrated in FIG. 17, the left-eye image projected by the projectors 13L and 13R reaches the left eye of the user, and the right-eye image projected by the projectors 13L and 13R reaches the right eye of the user. This allows the user to stereoscopically view the planar image. In FIG. 17, the image projected on the projection surface 11A is blurred, which means that the pixel position difference corresponding to the parallax is set in the left-eye image and the right-eye image.

Figure 18:
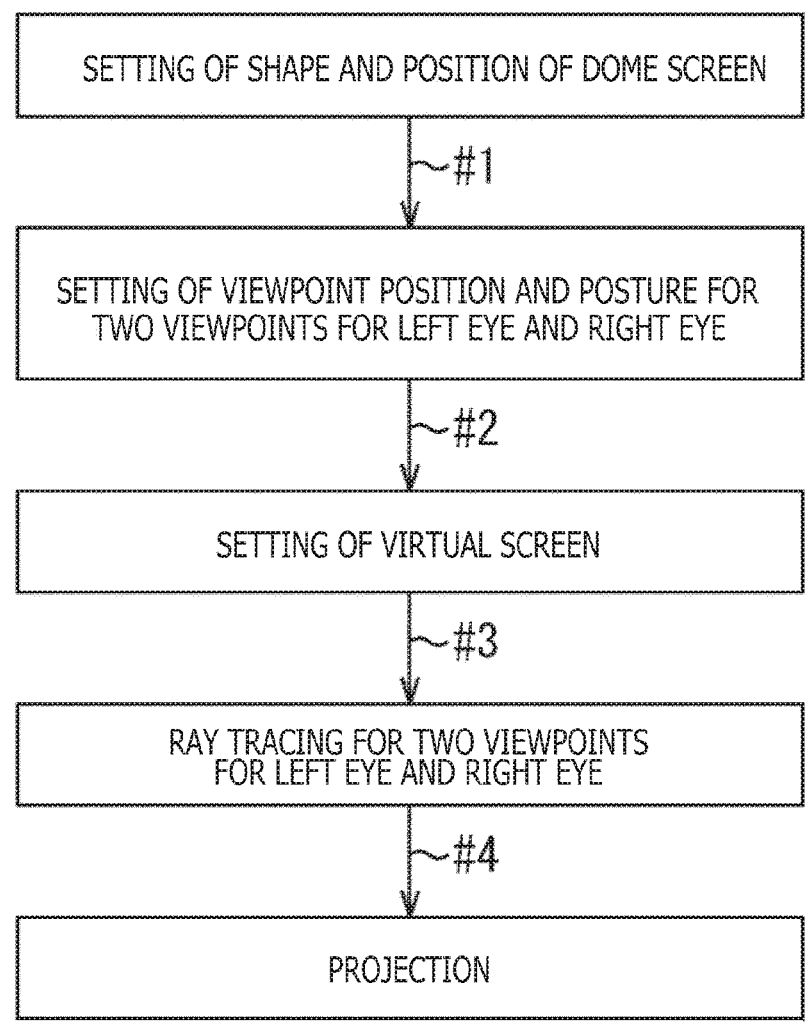
[FIG. 18]

FIG. 18 is a diagram illustrating an example of the flow of processing up to the projection of a 3D image.

The process flow illustrated in FIG. 18 is basically similar to the process flow described with reference to FIG. 7. That is, setting of the viewpoint position and posture indicated at the position ahead of the arrow #1 is performed by setting the viewpoint position and posture regarding each of viewpoints for the left eye and right eye.

Further, after the size and position of the virtual screen V are set, the ray tracing illustrated at the position ahead of the arrow #3 is performed such that the position of each of pixels forming the planar image is set on the projection surface 11A for each viewpoint for the left eye and the right eye.

To be specific, the position of each of pixels forming the left-eye image is set on the projection surface 11A on the basis of the position of each of the pixels when the left-eye image is virtually displayed on the virtual screen V and the position of the left eye. Further, on the basis of the position of each of pixels when the right-eye image is virtually displayed on the virtual screen V and the position of the right eye, the position of each of the pixels forming the right-eye image is set on the projection surface 11A.

The projection is performed after the positions of the respective pixels forming the left-eye image and the positions of the respective pixels forming the right-eye image are set.

In such a way, a 3D image can also be used as the planar image to be projected.

Other Examples

Head tracking may be performed by detecting the line of sight of the viewer or the like, and the projection range may be controlled according to the line of sight.

Some of the functional sections of the image processing apparatus 21 may be implemented by a predetermined PC, and other functional sections may be implemented by other PCs such that the functional sections of the image processing apparatus 21 can be implemented by a plurality of PCs.

The functional section of the image processing apparatus 21 may be achieved by a server on the Internet, and the image may be projected on the basis of the data transmitted from the server.

The series of processes described above can be executed by software in addition to hardware. In the case where the series of processes is executed by software, the program forming the software is installed in the computer of FIG. 11 or the like included in the image processing apparatus 21 from a program recording medium.

The program executed by the CPU 101 is recorded in the removable medium 115, for example, or provided via a wired or wireless transmission medium such as a local area network, the Internet, or digital broadcasting, and installed in the HDD 114.

The program executed by the computer may be a program in which processes are executed in time series in the order described in the present specification, or may be a program in which processes are executed in parallel or at a necessary timing such as when a call is made.

In the present specification, the system means a set of a plurality of constituent elements (apparatuses, modules (components), etc.), and it does not matter whether or not all the constituent elements are in the same housing. Therefore, a plurality of apparatuses housed in separate housings and connected via a network, and one apparatus containing a plurality of modules in one housing all serve as systems.

The effects described in the present specification are merely examples and are not limited thereto. Further, the effects described in the present specification may have other effects.

The embodiment of the present technology is not limited to the above-described embodiment, and various modifications can be made without departing from the gist of the present technology.

For example, the present technology may have a configuration of cloud computing in which a plurality of apparatuses shares one function via a network and jointly processes the function.

In addition, each step described in the above-mentioned flowcharts can be executed by one apparatus or shared by a plurality of apparatuses.

Further, in the case where one step includes a plurality of processes, the plurality of processes included in the one step can be executed by one apparatus or shared by a plurality of apparatuses.

The present technology may also have configurations as follows.

(1)

An image processing apparatus including:

a calculating section that calculates a position of each of pixels on a curved display surface, each of the pixels forming a planar image generated assuming that the image is displayed on a plane, on the basis of a positional relationship between a viewpoint position set in front of the display surface and a virtual surface set behind the display surface; and a display control section configured to display the planar image on the display surface such that each of the pixels is displayed at the calculated position.

(2)

The image processing apparatus described in the above-mentioned item 1, in which the display control section causes a projector to project the planar image on a screen having a curved projection surface as the display surface to display the planar image.

(3)

The image processing apparatus described in the above-mentioned item 2, in which the screen includes a dome-shaped screen.

(4)

The image processing apparatus described in the above-mentioned item 1, in which the display control section causes a curved display to display the planar image.

(5)

The image processing apparatus described in any one of the above-mentioned items 1 to 4, in which the calculating section calculates the position of each of the pixels forming the planar image on the display surface by performing ray tracing of each of the pixels of the planar image in the case where the planar image is displayed on the virtual surface.

(6)

The image processing apparatus described in any one of the above-mentioned items 1 to 5, further including:

a transform section that performs geometric transform of the planar image, on the basis of the position of each of the pixels forming the planar image on the display surface, in which the display control section displays the planar image after the geometric transform.

(7)

The image processing apparatus described in any one of the above-mentioned items 1 to 6, further including:

a reproducing section configured to reproduce content, in which the display control section displays the planar image obtained by reproducing the content.

(8)

The image processing apparatus described in the above-mentioned item 7, further including:

a detecting section configured to detect a state of a user in front of the display surface, in which the calculating section repeatedly calculates the position of each of the pixels forming the planar image on the display surface according to the viewpoint position depending on the state of the user during reproduction of the content.

(9)

The image processing apparatus described in any one of the above-mentioned items 1 to 8, further including:

an image processing section that performs filter processing on each of the pixels forming the planar image by using a parameter according to a position on the display surface, in which the display control section displays the planar image in which the filter processing is performed on each of the pixels.

(10)

The image processing apparatus described in any one of the above-mentioned items 1 to 9, in which the calculating section sets the virtual surface selected from a plurality of the virtual surfaces which is different in at least one of distance from the viewpoint position, size, or a position, and calculates the position of each of the pixels forming the planar image on the display surface.

(11)

A method of processing an image that is performed by an image processing apparatus, the method including:

calculating a position of each of pixels on a curved display surface, each of the pixels forming a planar image generated assuming that the image is displayed on a plane, on the basis of a positional relationship between a viewpoint position set in front of the display surface and a virtual surface set behind the display surface; and displaying the planar image on the display surface such that each of the pixels is displayed at the calculated position.

(12)
A program that cause a computer to execute the steps of:
calculating a position of each of pixels on a curved display surface, each of the pixels forming a planar image generated assuming that the image is displayed on a plane, on the basis of a positional relationship between a viewpoint position set in front of the display surface and a virtual surface set behind the display surface; and
displaying the planar image on the display surface such that each of the pixels is displayed at the calculated position.

(13)
A projection system including:
a screen having a curved projection surface;
a projector configured to project an image on the screen; and
an image processing apparatus including
a calculating section configured to calculate a position of each of pixels on the projection surface of the screen, each of the pixels forming a planar image generated assuming that the image is displayed on a plane, on the basis of a positional relationship between a viewpoint position set in front of the screen and a virtual surface set behind the screen, and
a display control section that causes the projector to project the planar image onto the projection surface such that each of the pixels is displayed at the calculated position.

REFERENCE SIGNS LIST

1 Multi-projection system, 11 Dome Screen, 11a Projection surface, 13L, 13R Projector, 14 Surround speaker, 15 Woofer, 16L, 16R Camera, 21 Image processing apparatus, 151 User state detecting section, 152 Ray tracing section, 153 Content reproducing section, 154 Geometric transform section, 155 Image processing section, 156 Projection control section

The invention claimed is:

1. An image processing apparatus, comprising:
a calculating section configured to calculate a position of each pixel of a plurality of pixels on a curved display surface based on a positional relationship between a viewpoint position set in front of the curved display surface and a virtual surface set behind the curved display surface,
wherein the plurality of pixels forms a planar image generated for display on a plane;
an image processing section configured to convert a pixel value of each pixel of the plurality of pixels based on a parameter that corresponds to the calculated position on the curved display surface, wherein the parameter that corresponds to the calculated position comprises enlargement/reduction ratio; and
a display control section configured to control display of the planar image on the curved display surface based on the conversion such that each pixel of the plurality of pixels is displayed at the calculated position.

2. The image processing apparatus according to claim 1, wherein the display control section is further configured to control a projector to project the planar image on a screen having a curved projection surface as the curved display surface.

3. The image processing apparatus according to claim 2, wherein the screen includes a dome-shaped screen.

4. The image processing apparatus according to claim 1, wherein the display control section is further configured to control a curved display to display the planar image.

5. The image processing apparatus according to claim 1, wherein the calculating section is further configured to calculate the position of each pixel of the plurality of pixels of the planar image on the curved display surface based on ray tracing of each pixel of the plurality of pixels in a case where the planar image is displayed on the virtual surface.

6. The image processing apparatus according to claim 1, further comprising:
a transform section configured to perform geometric transform of the planar image based on the position of each pixel of the plurality of pixels on the curved display surface, wherein the display control section is further configured to control the display of the planar image after the geometric transform.

7. The image processing apparatus according to claim 1, further comprising:
a reproducing section configured to reproduce content, wherein the display control section is further configured to control the display of the planar image obtained by the reproduction of the content.

8. The image processing apparatus according to claim 7, further comprising:
a detecting section configured to detect a state of a user in front of the curved display surface, wherein
the calculating section is further configured to repeatedly calculate the position of each pixel of the plurality of pixels on the curved display surface based on a change in the viewpoint position, and
the change in the viewpoint position depends on the state of the user during the reproduction of the content.

9. The image processing apparatus according to claim 1, wherein
the calculating section is further configured to set the virtual surface selected from a plurality of virtual surfaces, and
the plurality of virtual surfaces are different from one another in at least one of distance from the viewpoint position or size.

10. An image processing method, comprising:
calculating a position of each pixel of a plurality of pixels on a curved display surface based on a positional relationship between a viewpoint position set in front of the curved display surface and a virtual surface set behind the curved display surface,
wherein the plurality of pixels forms a planar image generated for display on a plane;
converting a pixel value of each pixel of the plurality of pixels based on a parameter that corresponds to the calculated position on the curved display surface, wherein the parameter that corresponds to the calculated position comprises enlargement/reduction ratio; and
displaying the planar image on the curved display surface based on the conversion such that each pixel of the plurality of pixels is displayed at the calculated position.

11. A non-transitory computer-readable medium having stored thereon computer-executable instructions that, when executed by a computer, cause the computer to execute operations, comprising:
calculating a position of each pixel of a plurality of pixels on a curved display surface based on a positional relationship between a viewpoint position set in front of the curved display surface and a virtual surface set behind the curved display surface, wherein the plurality of pixels forms a planar image generated for display on a plane;

converting a pixel value of each pixel of the plurality of pixels based on a parameter that corresponds to the calculated position on the curved display surface, wherein the parameter that corresponds to the calculated position comprises enlargement/reduction ratio; and displaying the planar image on the curved display surface based on the conversion such that each pixel of the plurality of pixels is displayed at the calculated position.

12. A projection system, comprising:

a screen having a curved projection surface;

a projector configured to project an image on the screen; and an image processing apparatus, including:
- a calculating section configured to calculate a position of each pixel of a plurality of pixels on the curved projection surface of the screen based on a positional relationship between a viewpoint position set in front of the screen and a virtual surface set behind the screen,
  wherein the plurality of pixels forms a planar image generated for display on a plane;
- an image processing section configured to convert a pixel value of each pixel of the plurality of pixels based on a parameter that corresponds to the calculated position on the curved projection surface, wherein the parameter that corresponds to the calculated position comprises enlargement/reduction ratio; and
- a display control section configured to control the projector to project, based on the conversion, the planar image onto the curved projection surface such that each pixel of the plurality of pixels is displayed at the calculated position.

13. An image processing apparatus, comprising:

a calculating section configured to calculate a position of each pixel of a plurality of pixels on a curved display based on a positional relationship between a viewpoint position set in front of the curved display and a virtual surface set behind the curved display,
  wherein the plurality of pixels forms a planar image generated for display on a plane; and a display control section configured to cause the curved display to display the planar image such that each pixel of the plurality of pixels is displayed at the calculated position.

14. An image processing apparatus, comprising:

a calculating section configured to:
  set a virtual surface selected from a plurality of virtual surfaces, wherein the plurality of virtual surfaces is different from one another based on at least one of distance from a viewpoint position set on the virtual surface or size of the virtual surface; and
  calculate a position of each pixel of a plurality of pixels on a curved display surface based on a positional relationship between the viewpoint position set in front of the curved display surface and the virtual surface set behind the curved display surface,
    wherein the plurality of pixels forms a planar image generated for display on a plane;

an image processing section configured to convert a pixel value of each pixel of the plurality of pixels based on a parameter that corresponds to the calculated position on the curved display surface; and a display control section configured to control display of the planar image on the curved display surface based on the conversion such that each pixel of the plurality of pixels is displayed at the calculated position.

* * * * *